(12) United States Patent
Lu

(10) Patent No.: US 10,686,730 B2
(45) Date of Patent: Jun. 16, 2020

(54) FUNCTION-EXPANDABLE WIRED NETWORK DEVICE

(71) Applicant: REALTEK SEMICONDUCTOR CORPORATION, Hsinchu (TW)

(72) Inventor: Kuo-Cheng Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/383,978

(22) Filed: Apr. 15, 2019

(65) Prior Publication Data

US 2019/0349317 A1    Nov. 14, 2019

(30) Foreign Application Priority Data

May 11, 2018 (TW) .............................. 107116110 A

(51) Int. Cl.
| | |
|---|---|
| *G06F 3/00* | (2006.01) |
| *H04L 12/947* | (2013.01) |
| *H04L 12/721* | (2013.01) |
| *H04L 29/06* | (2006.01) |
| *H04L 12/66* | (2006.01) |
| *H04L 12/46* | (2006.01) |
| *H04L 12/931* | (2013.01) |

(52) U.S. Cl.
CPC .......... *H04L 49/25* (2013.01); *H04L 12/4633* (2013.01); *H04L 12/66* (2013.01); *H04L 45/66* (2013.01); *H04L 49/351* (2013.01); *H04L 69/22* (2013.01)

(58) Field of Classification Search
CPC ......... H04L 49/25; H04L 45/66; H04L 69/22; H04L 12/66; H04L 12/4633; H04L 49/351
See application file for complete search history.

(56) References Cited

U.S. PATENT DOCUMENTS

| | | | |
|---|---|---|---|
| 2006/0013198 A1* | 1/2006 | Shore | H04L 49/604 370/352 |
| 2014/0269688 A1 | 9/2014 | Alsup et al. | |
| 2014/0269705 A1 | 9/2014 | DeCusatis et al. | |

(Continued)

OTHER PUBLICATIONS

Taiwan Intellectual Property Office, Office Action issued in counterpart TW application No. 107125066 dated Nov. 28, 2018. English summary on p. 1.

*Primary Examiner* — Lan-Huong Truong
(74) *Attorney, Agent, or Firm* — WPAT, PC

(57) ABSTRACT

Disclosed is a function-expandable wired network device using an external circuit to execute an operation an Ethernet device can't execute. The wired network device includes an Ethernet switch and a Field-Programmable Gate Array (FPGA). The switch includes Ethernet ports including a designated port and a first port, and receives a first packet from the first port; and if the first packet carries information meeting the information prestored in the switch, the switch amends the first packet to output a second packet to the designated port. The FPGA receives the second packet from the designated port and processes the second packet according to the switch's amendment to the second packet so as to output a third packet to the designated port. The switch then processes the third packet according to the FPGA's amendment to the third packet to output a fourth packet to one of the Ethernet ports.

20 Claims, 3 Drawing Sheets

(56) References Cited

U.S. PATENT DOCUMENTS

2015/0043576 A1* 2/2015 Dixon ................ H04L 12/184
 370/390
2015/0281099 A1 10/2015 Banavalikar
2016/0198390 A1* 7/2016 Aminaka ............ H04W 16/32
 370/328

* cited by examiner

FUNCTION-EXPANDABLE WIRED NETWORK DEVICE

BACKGROUND OF THE INVENTION

1. Field of the Invention

The present invention relates to a network device, especially to a function-expandable wired network device.

2. Description of Related Art

In the communication field, a tunnel technique can encapsulate an original packet complying with a communication protocol to generate a tunnel packet complying with another communication protocol (i.e., a tunnel protocol), and the tunnel technique can decapsulate the tunnel packet to obtain the data of the original packet. Accordingly, the tunnel technique is useful for the data transmission between incompatible network devices complying with different communication protocols, or for providing a secure path in an unsecure network.

In recent years, many modern tunnel protocols are introduced to satisfy different requirements. However, when a conventional Ethernet device receives a packet complying with a tunnel protocol that the Ethernet device does not support, the Ethernet device forwards the packet to an internal processor of a higher layer (e.g., an application layer) in the Ethernet device so that the internal processor will process the packet, or the Ethernet device forwards the packet to an external processor outside the Ethernet device through a non-Ethernet interface (e.g., Peripheral Component Interconnect Express, PCIe) so that the external processor will process the packet in conjunction with proper software/hardware; unfortunately, the above-mentioned manners have problems of low efficiency.

Furthermore, some Ethernet device is capable of adding a private header carrying information about a tunnel protocol to a packet and then transmitting the packet to a processing circuit capable of recognizing and processing the private header. In consideration of that the private header is not in common use, this manner cannot be widely applied.

In addition, some research suggests having a conventional Ethernet device use the header of an Ethernet packet to carry information about a tunnel protocol. However, since the function of the conventional Ethernet device (e.g., network switch) is not expandable, the conventional Ethernet device is short of configurability to transmit the Ethernet packet carrying the information of the tunnel protocol to a processing circuit; even though the conventional Ethernet device can forward the Ethernet packet to the processing circuit, the conventional Ethernet device is still unable to process the Ethernet packet which has been processed by the processing circuit.

SUMMARY OF THE INVENTION

An object of the present invention is to provide a function-expandable wired network device capable of using an external circuit to execute an operation an Ethernet device is incapable to execute.

The present invention discloses a function-expandable wired network device. An embodiment of the function-expandable wired network device includes an Ethernet device and an external circuit. The Ethernet device includes Ethernet ports including a designated port and a first port. The Ethernet device is operable to receive a first packet from the first port, and execute a first amendment to the first packet to output a second packet to the designated port when the first packet meets a first predetermined condition. The external circuit is coupled to the designated port, and operable to receive the second packet and execute a second amendment to the second packet to output a third packet to the designated port in accordance with a result of the first amendment in the second packet; afterward the Ethernet device is operable to receive the third packet from the designated port and process the third packet to output a fourth packet to one of the Ethernet ports in accordance with a result of the second amendment in the third packet. In an exemplary implementation, the external circuit decapsulates the second packet (i.e., a tunnel packet in this implementation) according to the result of the first amendment and thereby generates the third packet, or the external circuit encapsulates the second packet according to the information of a specific tunnel protocol based on the result of the first amendment and thereby generates the third packet; in this implementation, the Ethernet device is incapable to execute the above-mentioned decapsulation and encapsulation.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present invention discloses a function-expandable wired network device capable of using an external circuit to execute an operation an Ethernet device is incapable to execute. As a result, the present invention can be widely applied regardless of the capability of the above-mentioned Ethernet device.

Figure 1:
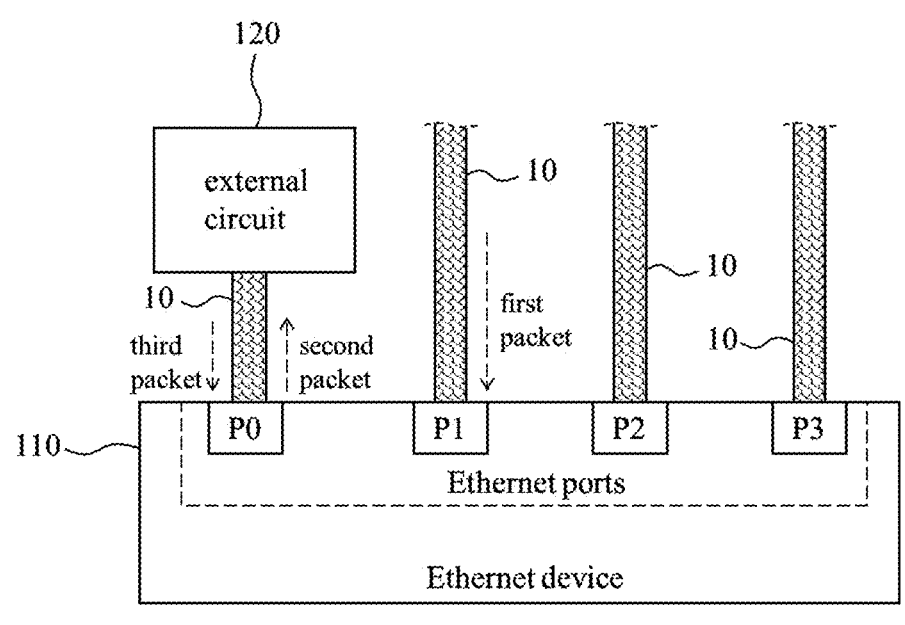
FIG. 1 shows an embodiment of the function-expandable wired network device of the present invention.

FIG. 1 shows an embodiment of the function-expandable wired network device of the present invention. As shown in FIG. 1, the function-expandable wired network device 100 includes an Ethernet device 110 and an external circuit 120 that are connected through an Ethernet interface, in which the Ethernet interface could be a single Ethernet port or a link aggregation port including a bundle of Ethernet ports as described in the reference "https://en.wikipedia.org/wiki/Link_aggregation". An exemplary implementation of the Ethernet device 110 is an Ethernet switch which is designed in light of user demands to support an OpenFlow protocol or a non-OpenFlow protocol. An exemplary implementation of the external circuit 120 is a field-programmable gate array (FPGA) or the equivalent thereof; in an alternative exemplary implementation, the external circuit 120 is one of the following: a central processing unit (CPU) or the equivalent thereof; a network processing unit (NPU) or the equivalent thereof; and an application-specific integrated circuit (ASIC) or the equivalent thereof. The Ethernet device 110 can function without the external circuit 120; however, in the aspect of executing a specific function (e.g., a function of processing a packet complying with a tunnel protocol), the cooperation of the Ethernet device 110 and the external circuit 120 can achieve better efficiency than that of the operation of the Ethernet device 110 alone.

As shown in FIG. 1. The Ethernet device 110 includes four Ethernet ports P0, P1, P2 and P3. These Ethernet ports include a designated port P0 and a first port P1. The Ethernet device 110 receives and transmits packets through these ports and a transmission line 10. In an exemplary implementation, the Ethernet device 110 receives a first packet from the first port P1; when the first packet meets a first predetermined condition (e.g., when the first packet carries specific information equivalent to the information prestored in the Ethernet device 110), the Ethernet device 110 amends the header of the first packet to generate a packet, which is treated as a second packet, directed to the external circuit 120, and then the Ethernet device 110 outputs the second packet to the external circuit 120 through the designated port P0; when the first packet does not meet the first predetermined condition, the Ethernet device 110 amends the header of the first packet to generate a packet, which is treated as the second packet, directed to another network device (e.g., another Ethernet switch), and then the Ethernet device 110 outputs the second packet to the another network device though one of the Ethernet ports (i.e., P1, P2 and P3) except the designated port P0. An exemplary implementation of the first predetermined condition includes one of a first condition and a second condition. The first condition specifies that the first packet is a tunnel packet (e.g., a packet of general packet radio service tunnel protocol (GPRS tunnel protocol, GTP); when the first packet meets the first condition, the Ethernet device 110 outputs the second packet, which is also a tunnel packet here, to the external circuit 120 through the designated port P0 and thereby the external circuit 120 decapsulates the second packet. The second condition specifies that the first packet is a native Ethernet packet (i.e., a packet without tunnel encapsulation) needing tunnel encapsulation (i.e., the encapsulation in compliance with the specific tunnel protocol described below); when the first packet meets the second condition, the Ethernet device 110 outputs the second packet, which is an Ethernet packet needing tunnel encapsulation here, to the external circuit 120 through the designated port P0 and thereby the external circuit 120 encapsulates the second packet according to the information of a specific tunnel protocol (e.g., the GTP or a known/self-developed tunnel protocol). It should be noted that in another embodiment, the Ethernet device 110 includes one or more additional designated ports functioning like the designated port P0, in which the additional designated port(s) may be selected from the Ethernet ports P2 and P3 or selected from the other Ethernet port(s) (not shown in FIG. 1) of the Ethernet device 110, if any.

Figure 2:
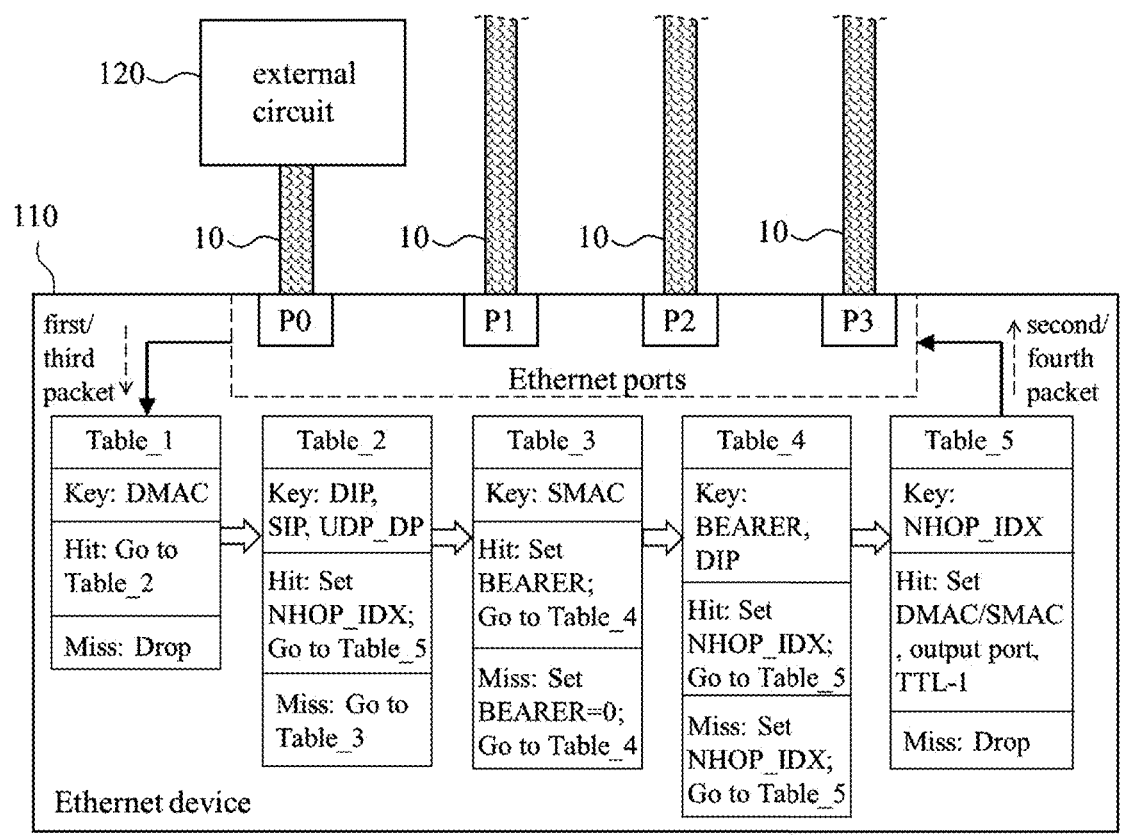
FIG. 2 shows an embodiment of the Ethernet device of FIG. 1.

On the basis of the above description, the Ethernet device 110 can use a known look-up table (LUT) technique or other known techniques such as a comparison procedure to determine whether the content of one or more fields (e.g., the field of Data Link Layer and/or the field of Network Layer) of the header of the first packet meets one of the first condition and the second condition. An example of the content of the one or more fields includes at least one of the following information: the destination media access control address (DMAC); the source media access control address (SMAC); the destination internet protocol address (DIP); the source internet protocol address (SIP); the destination port of the user datagram protocol (UDP); and the bearer. In an exemplary implementation, the Ethernet device 110 is a network switch supporting an OpenFlow protocol; the network switch can be configured by a user to execute multiple decision procedures as shown in Table_1~Table_5 of FIG. 2. Table_1~Table_5 are explained below:

(1) Table_1 shows that the Ethernet device 110 is operable to determine whether the DMAC of the first packet is the MAC of the Ethernet device 110 (i.e., the label "Key: DMAC" of Table_1); if the result of the above determination is affirmative, the Ethernet device 110 executes the decision procedure of Table_2 (i.e., the label "Hit: Go to Table_2" of Table_1); and if the result of the above determination is negative, the Ethernet device 110 discards the first packet (i.e., the label "Miss: Drop" of Table_1).

(2) Table_2 shows that the Ethernet device 110 is operable to determine whether the first packet is a tunnel packet according to at least one of the DIP, the SIP, and the destination port of the UDP of the first packet (i.e., the label "Key: DIP, SIP, UDP_DP" of Table_1); if the result of the above determination is affirmative, the Ethernet device 110 sets a parameter NHOP_IDX and executes the decision procedure of Table_5 (i.e., the label "Hit: Set NHOP_IDX; Go to NEXT_HOP" of Table_2); and if the result of the above determination is negative, the Ethernet device 110 executes the decision procedure of Table_3 (i.e., the label "Miss: Go to Table_3" of Table_1).

(3) Table_3 shows that the Ethernet device 110 is operable to determine whether the first packet needs tunnel encapsulation according to the SMAC of the first packet (i.e., the label "Key: SMAC" of Table_3); if the result of the above determination is affirmative, the Ethernet device 110 sets a parameter BEARER and executes the decision procedure of Table_4 (i.e., the label "Hit: Set BEARER; Go to Table_4" of Table_3); and if the result of the above determination is negative, the Ethernet device 110 sets the parameter BEARER as zero and executes the decision procedure of Table_4 (i.e., the label "Miss: Set BEARER=0; Go to Table_4" of Table_3).

(4) Table_4 shows that the Ethernet device 110 determines how to forward the first packet according to at least one of the bearer and the DIP of the first packet (i.e., the label "Key: BEARER, DIP" of Table_4); if the result of the above determination is the first result, the Ethernet device 110 sets the parameter NHOP_IDX and executes the decision procedure of Table_5 (i.e., the label "Hit: Set NHOP_IDX; Go to Table_5" of Table_4); and if the result of the above determination is the second result, the Ethernet device 110 sets the parameter NHOP_IDX and executes the decision procedure of Table_5 (i.e., the label "Miss: Set NHOP_IDX; Go to Table_5" of Table_4), in which the setting of the parameter NHOP_IDX for the first result is different from the setting of the parameter NHOP_IDX for the second result.

(5) Table_5 shows that the Ethernet device 110 refers to the parameter NHOP_IDX (i.e., the label "Key: NHOP_IDX" of Table_5) so that the Ethernet device 110 sets at least one of the DMAC, the SMAC, the output port, and the decrement of TTL (time to live) of the first packet when the parameter NHOP_IDX is equivalent to one of prestored parameters (i.e., the label "Hit: Set DMAC/SMAC, output port, TTL-1" of Table_5), and the Ethernet device 110 discards the first packet when the parameter NHOP_IDX is not equivalent to any of the prestored parameters (i.e., the label "Miss: Drop" of Table_5).

Please refer to FIG. 1. In an exemplary implementation, the external circuit 120 receives the second packet from the designated port P0 and processes the second packet according to the result of a first amendment, executed by the Ethernet device 110, in the second packet to output a third packet to the Ethernet device 110 through the designated port P0; afterward the Ethernet device 110 processes the third packet according to the result of a second amendment, executed by the external circuit 120, in the third packet to output a fourth packet to one of the Ethernet ports P0~P3. In an exemplary implementation, the Ethernet device 110 executes the first amendment to the DMAC and/or SMAC of the first packet to generate the second packet so that the external circuit 120 is allowed to execute decapsulation or encapsulation according to the DMAC and/or the SMAC of the second packet. In this implementation, when the first packet meets the aforementioned first condition, which implies that the first packet is a tunnel packet, the first amendment results in the DMAC of the second packet being a first value; and when the first packet meets the aforementioned second condition, which implies that the first packet is a native Ethernet packet needing tunnel encapsulation, the first amendment results in the DMAC of the second packet being a second value. Accordingly, the external circuit 120 is allowed to decapsulate the second packet to generate the third packet when the DMAC of the second packet is the first value, and allowed to encapsulate the second packet to generate the third packet based on the information of the aforementioned specific tunnel protocol (e.g., a table of the GTP and the tunnel endpoint identifier (TEID)) when the DMAC of the second packet is the second value. In an exemplary implementation, the second amendment includes the amendment to the DMAC of the second packet (e.g., the amendment altering the DMAC of the second packet to be the MAC of the Ethernet device 110) and the amendment to the SMAC of the second packet (e.g., the amendment, executed when the external circuit 120 encapsulates the second packet to generate the third packet, altering the SMAC of the second packet to carry information such as TEID in compliance with a tunnel protocol) for the generation of the third packet; therefore, the Ethernet device 110 can receive the third packet according to the DMAC of the third packet and can alter the third packet according to the SMAC of the third packet to output the fourth packet to another network device (e.g., another Ethernet switch) or to the external circuit 120 for encapsulation. It should be noted that when the fourth packet is outputted to the external circuit 120 for encapsulation, the third packet is generated by the external circuit 120 decapsulating the second packet. In an exemplary implementation, the Ethernet device 110 does not support or stops supporting the specific tunnel protocol or the Ethernet device 110 is unable to process a packet of the specific tunnel protocol without using a CPU/NPU; in the meantime, the assistance of the external circuit 120 allows the function-expandable wired network device 100 to support the specific tunnel protocol without using a CPU/NPU.

On the basis of the above description, the Ethernet device 100 is further configured to determine whether the third packet meets a second predetermined condition so as to transmit the fourth packet to the another network device or transmit the fourth packet to the external circuit 120. In detail, if the third packet meets the second predetermined condition, the Ethernet device 110 amends the third packet to output the fourth packet to the designated port P0 so as to allow the external circuit 120 to receive and process the fourth packet; if the third packet does not meet the second predetermined condition, the Ethernet device 110 amends the third packet to output the fourth packet to one of the Ethernet ports (i.e., P1, P2 and P3) except the designated port P0 so as to transmit the fourth packet to the another network device. In an exemplary implementation, the second predetermined condition is similar to the aforementioned second condition; in detail, the second predetermined condition specifies that the third packet is an Ethernet packet needing tunnel encapsulation (e.g., the encapsulation in compliance with the aforementioned specific tunnel protocol). In an exemplary implementation, when the third packet meets the second predetermined condition, the external circuit 120 processes the fourth packet according to the result of a third amendment, executed by the Ethernet device 110, in the fourth packet to output a fifth packet to the Ethernet device 110 through the designated port P0; afterward the Ethernet device 110 processes the fifth packet according to the result of a fourth amendment, executed by the external circuit 120, in the fifth packet to output a sixth packet to one of the Ethernet ports (i.e., P1, P2 and P3) except the designated port P0. In an exemplary implementation, the third amendment is similar to the first amendment and includes the amendment to the DMAC and/or the SMAC of the third packet; the fourth amendment is similar to the second amendment and includes the amendment to the DMAC and the SMAC of the fourth packet. In an exemplary implementation, the external circuit 120 encapsulates the fourth packet according to the aforementioned specific tunnel protocol and thereby to outputs the fifth packet to the designated port P0.

Please refer to FIG. 1. Regardless of the fact that the first packet is a modern tunnel packet whose payload includes an Ethernet header or the first packet is a native Ethernet packet, the embodiment of FIG. 1 is workable without amending the Ethernet header of the first packet. In an exemplary implementation, the Ethernet device 110 supports a legacy tunnel protocol and thus the Ethernet device 110 and the external circuit 120 use a legacy tunnel header in compliance with the legacy tunnel protocol to carry the information of a tunnel protocol that the Ethernet device 110 does not support or stops supporting; in detail, when the first packet is a tunnel packet in compliance with the legacy tunnel protocol, the Ethernet device 110 amends a preexisting legacy tunnel header of the first packet (while the amended preexisting legacy tunnel header is treated as the header of the second packet) to generate the second packet or combines a new legacy tunnel header with the first packet (while the new legacy tunnel header is treated as the header of the second packet) to generate the second packet, and when the first packet is a native Ethernet packet or a modern tunnel packet which does not comply with the legacy tunnel protocol, the Ethernet device 110 combines a legacy tunnel header and the first packet to generate the second packet. In an exemplary implementation, when the first packet does not include a preexisting legacy tunnel header, the aforementioned first amendment includes combining a legacy tunnel header with the first packet to generate the second packet while the legacy tunnel header acts as the header of the second packet, and thereby the external circuit 120 processes the second packet according to the information carried by the legacy tunnel header to output the third packet to the designated port P0. In an implementation, when the first packet includes a preexisting legacy tunnel header, the first amendment includes an amendment to the preexisting legacy tunnel header (e.g., an amendment to the DMAC/SMAC of the preexisting legacy tunnel header or an amendment to at least one unused filed of the preexisting legacy tunnel header) while the amended preexisting legacy tunnel header acts as the header of the second packet, and thereby the external circuit 120 processes the second packet according to the information carried by the amended preexisting legacy tunnel header to output the third packet to the designated port P0. In an exemplary implementation, when the first packet includes a preexisting legacy tunnel header, the first amendment includes combining a new legacy tunnel header with the first packet to generate the second packet so that the preexisting legacy tunnel header is left unchanged and the new legacy tunnel header acts as the header of the second packet; therefore, the external circuit 120 processes the second packet according to the information carried by the new legacy tunnel header to output the third packet to the designated port P0. In an implementation, the aforementioned second amendment includes an amendment to the legacy tunnel header (e.g., an amendment to the DMAC/SMAC of the legacy tunnel header) which acts as the header of the second packet, and thereby the Ethernet device 110 amends the third packet according to the information carried by the legacy tunnel header to output the fourth packet. In summary, the embodiment of FIG. 1 can use a legacy tunnel header to carry the information that is necessary for a following process (e.g., a tunnel encapsulation process for a packet or a decapsulation process for a tunnel packet), and can optionally prevent the original header of the first packet from being amended.

Figure 3:
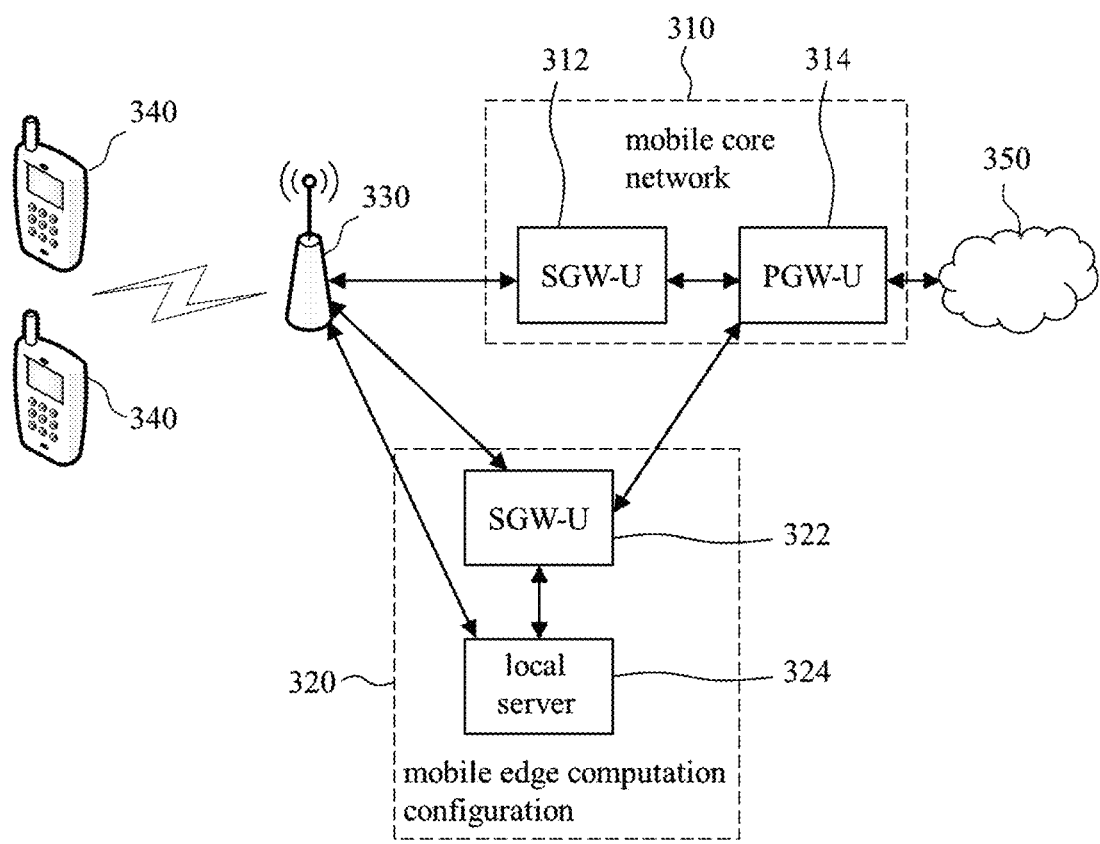
FIG. 3 shows an embodiment of an application of the function-expandable wired network device of the present invention.

Please refer to FIG. 1. In an exemplary implementation, at least one of the Ethernet ports P0, P1, P2, and P3 is treated as a link aggregation (LAG) port. The LAG port(s) include(s) the designated port P0. The Ethernet device 110 and the external circuit 120 constitute a link aggregation connection with the LAG port(s), in which the link aggregation connection complies with an IEEE 802.3ad standard and a transmission rate of the link aggregation connection is not lower than 10 Gigabit/s. In an exemplary implementation, the transmission through the Ethernet ports P0, P1, P2, and P3 is full-duplex transmission. In an exemplary implementation as shown in FIG. 3, the function-expandable wired network device 100 can be treated as a serving gateway-user plane (SGW-U) 312 of a user layer in a mobile core network 310; the function-expandable wired network device 100 can also be treated as a SGW-U 322 in a mobile edge computation configuration 320 while the function-expandable wired network device 100 is set between any two of the following: an evolved node B (eNB) 330 of Long Term Evolution (LTE), which is configured to communicate with one or more client devices 340; a local server 324 connected to the SGW-U 322; and a packet data network gateway-user plane (PDN gateway-user plane, PGW-U) 314 connected to the SGW-U 312 and the internet 350. It should be noted that each of the mobile core network 310 and the mobile edge computation configuration 320 may include other hardware and/or connection; since this is well-known in this industrial field, the detail is omitted here.

Although the aforementioned amendments (e.g., the first amendment, the second amendment, the third amendment, and the fourth amendment) to the header of a packet are illustrated with the amendment to the DMAC and/or the SMAC, the present invention is not limited thereto. For instance, the present invention can amend other fields of Data Link Layer and/or Network Layer (e.g., Ether type, VLAN tag) to carry specific information (e.g., information about a tunnel protocol) so as to allow the Ethernet device 110 and/or the external circuit 120 to execute a recognition process and take any appropriate process. It should be noted that the way to amend the header of a packet, the way to execute tunnel encapsulation for a packet, and the way to execute decapsulation for a tunnel packet are well known in this industrial field; therefore, their detail is omitted here while the written description and the enablement requirements are still fulfilled. It should also be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly.

To sum up, the function-expandable wired network device of the present invention can use an external circuit to execute an operation that an Ethernet device is incapable to execute; therefore the present invention can be applied easily since the hardware of the Ethernet device has no need to be modified.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A function-expandable wired network device, comprising:
an Ethernet device including Ethernet ports, in which the Ethernet ports include a designated port and a first port, the Ethernet device is configured to receive a first packet from the first port, and when the first packet meets a first predetermined condition, the Ethernet device executes a first amendment to the first packet to output a second packet to the designated port; and
an external circuit, coupled to the designated port, configured to receive the second packet from the designated port and execute a second amendment to the second packet to output a third packet in accordance with a result of the first amendment,
wherein the Ethernet device is configured to process the third packet according to a result of the second amendment to output a fourth packet to one of the Ethernet ports after the Ethernet device's reception of the third packet.

2. The function-expandable wired network device of claim 1, wherein the Ethernet device is a network switch which supports or does not support an OpenFlow protocol, and the external circuit is a field-programmable gate array (FPGA).

3. The function-expandable wired network device of claim 1, wherein the first amendment includes at least one of following amendments: an amendment to a destination media access control address (DMAC) of the first packet; and an amendment to a source media access control address (SMAC) of the first packet.

4. The function-expandable wired network device of claim 1, wherein the second amendment includes following amendments: an amendment to a destination media access control address of the second packet; and an amendment to a source media access control address of the second packet.

5. The function-expandable wired network device of claim 1, wherein the external circuit is configured to process the second packet in one of following manners: decapsulating the second packet according to the first amendment and thereby generating the third packet; and encapsulating the second packet according to information of a specific tunnel protocol based on the first amendment and thereby generating the third packet.

6. The function-expandable wired network device of claim 5, wherein the Ethernet device does not support the specific tunnel protocol.

7. The function-expandable wired network device of claim 5, wherein the first predetermined condition includes one of a first condition and a second condition; the first condition specifies that the first packet is a tunnel packet; the second condition specifies that the first packet is an Ethernet packet requiring tunnel encapsulation; when the first packet meets the first condition, the external circuit is configured to decapsulate the second packet; and when the first packet meets the second condition, the external circuit is configured to encapsulate the second packet according to the information of the specific tunnel protocol.

8. The function-expandable wired network device of claim 7, wherein when the first packet meets the first condition, the first amendment includes having a destination media access control address of the second packet be a first value; and when the first packet meets the second condition, the first amendment includes having the destination media access control address of the second packet be a second value.

9. The function-expandable wired network device of claim 1, wherein when the third packet meets a second predetermined condition, the Ethernet device is configured to execute a third amendment to the third packet to output the fourth packet to the designated port; and when the third packet does not meet the second predetermined condition, the Ethernet device is configured to amend the third packet to output the fourth packet to one of the Ethernet ports except the designated port.

10. The function-expandable wired network device of claim 9, wherein when the third packet meets the second predetermined condition, the external circuit is configured to receive the fourth packet from the designated port and execute a fourth amendment to the fourth packet to output a fifth packet in accordance with a result of the third amendment, and the Ethernet device is configured to receive and process the fifth packet to output a sixth packet to one of the Ethernet ports except the designated port in accordance with a result of the fourth amendment.

11. The function-expandable wired network device of claim 10, wherein the third amendment includes at least one of following amendments: an amendment to a destination media access control address of the third packet; and an amendment to a source media access control address of the third packet.

12. The function-expandable wired network device of claim 10, wherein the fourth amendment includes following amendments: an amendment to a destination media access control address of the fourth packet; and an amendment to a source media access control address of the fourth packet.

13. The function-expandable wired network device of claim 10, wherein the external circuit is configured to encapsulate the fourth packet to output the fifth packet to the designated port according to information of a specific tunnel protocol.

14. The function-expandable wired network device of claim 1, wherein the Ethernet device supports a legacy tunnel protocol and is configured to encapsulate the first packet to generate the second packet in accordance with the legacy tunnel protocol.

15. The function-expandable wired network device of claim 14, wherein when the first packet does not include a preexisting legacy tunnel header, the first amendment includes combining a legacy tunnel header with the first packet to generate the second packet so that the external circuit processes the second packet according to the legacy tunnel header and thereby outputs the third packet; and when the first packet includes the preexisting legacy tunnel header, the first amendment includes amending the preexisting legacy tunnel header or combining a new legacy tunnel header with the first packet to generate the second packet so that the external circuit processes the second packet according to the preexisting legacy tunnel header when the preexisting legacy tunnel header is amended or according to the new legacy tunnel header when the second packet includes the new legacy tunnel header and then the external circuit outputs the third packet.

16. The function-expandable wired network device of claim 15, wherein the second amendment includes amending a header among the legacy tunnel header, the preexisting legacy tunnel header, and the new legacy tunnel header, and after the header is amended, the header acts as a header of the second packet.

17. The function-expandable wired network device of claim 1, wherein the Ethernet device and the external circuit constitute a link aggregation (LAG) connection by at least one link aggregation port of the Ethernet ports while the link aggregation connection conforms to an IEEE 802.3ad standard and the at least one link aggregation port includes the designated port.

18. The function-expandable wired network device of claim 1, wherein a transmission rate of the link aggregation connection is not lower than 10 gigabits per second.

19. The function-expandable wired network device of claim 1, wherein the function-expandable wired network device is set between any two of following: an evolved node B (eNB) of Long Term Evolution (LTE); a local server; and a packet data network gateway (PDN gateway, PGW).

20. The function-expandable wired network device of claim 1, wherein the function-expandable wired network device acts as a serving gateway-user plane (SGW-U).

* * * * *